July 26, 1960 J. HEADLEY 2,946,629
GRAIN BLOWER ASSEMBLY
Filed March 21, 1958
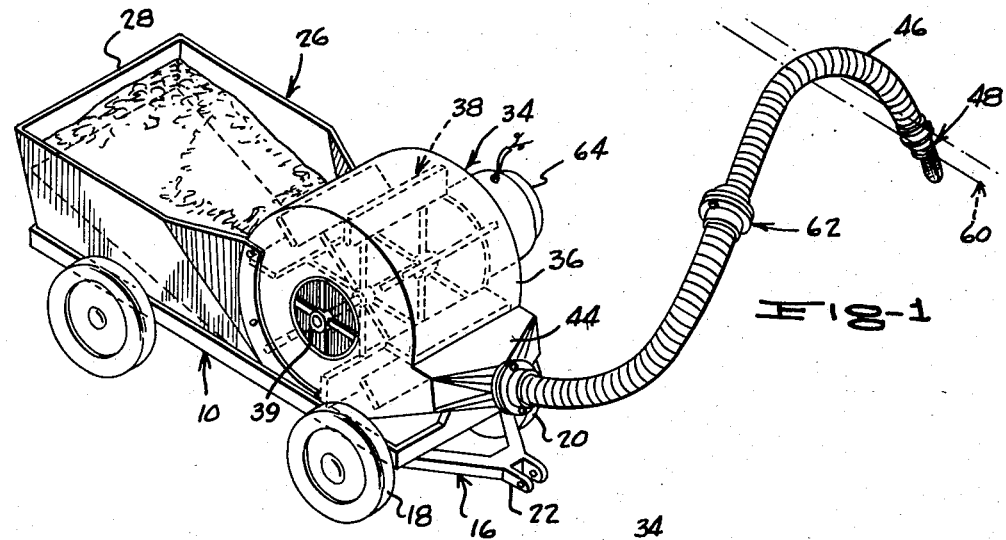
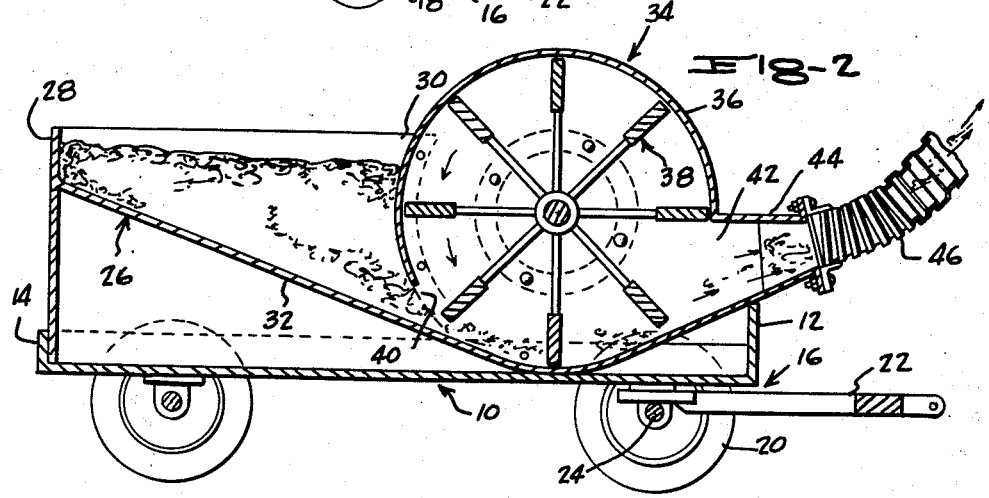
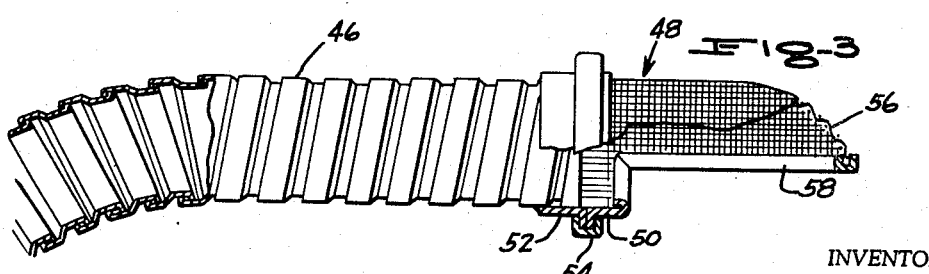
INVENTOR.
JOHN HEADLEY
BY
McMorrow, Berman & Davidson
ATTORNEYS

2,946,629

GRAIN BLOWER ASSEMBLY

John Headley, R.R. 4, Angola, Ind.

Filed Mar. 21, 1958, Ser. No. 722,897

2 Claims. (Cl. 302—37)

The present invention relates to a grain blower assembly.

An object of the present invention is to provide a grain blower assembly which lends itself to ready movement behind a towing vehicle so that grain may be conveniently and efficiently blown into a place of storage.

Another object of the present invention is to provide a grain blower assembly which is easily and readily attached to or detached from a supporting mobile frame.

A further object of the present invention is to provide a grain blower assembly which is simple in structure, one sturdy in construction, and one which is economically feasible.

These and other objects and advantages of the present invention will be fully apparent from the following description when taken in conjunction with the annexed drawing, in which:

Figure 1 is an isometric view of the grain blower assembly according to the present invention, showing the discharge end of the flexible conduit extending over the wall of a storage space, the wall being indicated in dotted lines;

Figure 2 is a sectional view of the assembly shown in Figure 1; and

Figure 3 is a detail view partially in section of the discharge end of the flexible conduit portion of the grain blower assembly according to the present invention.

Referring in greater detail to the drawing in which like numerals indicate like parts throughout the several views, the grain blower assembly according to the present invention comprises a horizontally disposed frame 10 having a forward end and a rearward end, such ends being designated by the reference numerals 12 and 14 in Figure 2. A steerable wheel assembly 16 including a pair of wheels 18 and 20 is mounted beneath and supports the forward end 12 of the frame 10. The assembly includes a forwardly projecting tongue 22 having its rearward end connected to the axle 24 which is supported upon the wheels 18 and 20.

A receptacle 26 having an open top is arranged in superimposed relation with respect to the frame 10. The receptacle 26 has a closed end 28 and an open end designated by the reference numeral 30 in Figure 2. The bottom 32 of the receptacle 26 slopes downwardly from a point below and adjacent to the upper end of the closed end 28 to the open end 30. The lower end of the bottom 32 rests upon the upper face of the frame 10.

A blower, designated generally by the reference numeral 34, including a horizontally disposed drum 36 and a rotatable vane assembly 38, is positioned so that the drum 36 is transversely of the frame 10 exteriorly of and in bridging relation with respect to the open end 30 of the receptacle 26. The drum 36 is provided with an opening 40 adjacent the lower end of the receptacle bottom 32, the opening 40 providing an inlet for grain to be blown by the vane assembly 38. An air inlet opening 39 is provided in the right-hand end (facing forwardly) of the drum 36 to serve as an air intake for the blower 34.

The drum 36 is also provided with another opening 42 contiguous to the forward end 12 of the frame 10. A discharge neck 44 surrounds the opening 42 and has one end connected to the drum 36 and has the other end connected to one end of a flexible conduit 46.

A semicylindrical spout 48 is carried by the other end of the flexible conduit 46 and is rotatably mounted thereon, the spout 48 having a flanged ring 50 on one end arranged in abutting relation with respect to another flanged ring 52 fixedly secured on the end of the conduit 46. The flanges of the rings 50 and 52 are in face to face abutting relation and are surrounded by a grooved ring 54 permitting relative movement of the spout 48 in clockwise or counterclockwise direction with respect to the adjacent end of the conduit 46. The other end of the spout 48 remote from the ring 50 is arcuately curved as at 56. The spout 48 is fabricated of mesh material with a channel strip 58 extending about the open face of the spout 48 and merging with the ring 50, as shown most clearly in Figure 3.

The flexible conduit 46 is fabricated of a metal strip rolled to an S-shaped configuration with the inwardly projecting flange of one convolution overlying and engaging the outwardly projecting flange of the following convolution. This spirally wound strip, embodying the flexible conduit 46, provides a rigid walled conduit capable of being bent in curves as in Figure 1 so that grain may be delivered into an enclosure having a wall with the spout 48 below the upper end of such wall, the wall being indicated in dotted lines and designated by the reference numeral 60 in Figure 1.

Preferably, the flexible conduit 46 is formed in two sections with a coupling member 62 joining the adjacent ends of such sections together, as shown in Figure 1.

In a preferred form of the invention, a motor 64 is carried on the frame 10 adjacent one end of the drum 36 and is operatively and drivably connected to the vane assembly 38 within the drum 36.

In operation, grain, or other material to be moved to a place of storage, is loaded into the receptacle 26 and the motor 64 is energized so that the vane assembly 38 rotates in the direction of the arrows shown in Figure 2. The vane assembly 38 will create a blast of air through the conduit 46 to the place of storage by drawing air through the intake 39, imparting velocity and energy thereto, and forcing it out of opening 42. The grain entering the small opening 40 is caught up in the air stream and is blown out through the opening 42, through the conduit 46 and finally through the nozzle 48. The mesh of the spout 48 serves to separate the grain from straw and chaff and it may be rotated so as to direct the grain flow to the proper and desired place of storage.

What is claimed is:

1. A grain blower assembly comprising a horizontally disposed wheel-supported frame having a forward end and a rearward end, an open top receptacle having one end closed and the other end open arranged in superimposed relation with respect to said frame so that the closed end is contiguous to the rearward end of said frame and the open end is inwardly of and spaced from the forward end of said frame, the bottom of said receptacle sloping downwardly from said closed end to said open end, a blower including a horizontally disposed drum and a rotatable vane assembly disposed within said drum positioned so that said drum is transversely of said frame exteriorly of and in bridging relation with respect to the open end of said receptacle, there being a first opening in the portion of said drum adjacent the lower end of said receptacle bottom and a second opening in the portion of said drum contiguous to the forward end of said frame, an air intake opening in one end of said drum, conduit means having one end in communication with said second drum opening and having the other end remote from said drum, and motor means carried by said frame and drivably connected to said vane assembly.

2. A grain blower assembly comprising a receptacle having a bottom and rearward and forward ends, said rearward end being closed, said bottom sloping downwardly from said closed end to said open end, a blower including a horizontally disposed drum and a vane assembly inside said drum mounted for rotation about a horizontal axis, said drum being positioned across said forward end to provide a closed wall therefor, a first opening in the portion of said drum adjacent to the lower end of said bottom and a second opening in the portion of said drum spaced forwardly of said first opening, an air intake opening in one end portion of said drum, and motor means for rotating said vane assembly at a velocity which produces a blast of air out of said second opening.

References Cited in the file of this patent

UNITED STATES PATENTS

| | | |
|---|---|---|
| 979,184 | Matthiessen | Dec. 20, 1910 |
| 2,634,962 | Eglitis | Apr. 14, 1953 |

FOREIGN PATENTS

| | | |
|---|---|---|
| 686,843 | France | Apr. 22, 1930 |
| 843,974 | Germany | May 21, 1952 |